W. B. FRUE & W. McDERMOTT.
Manufacture of Flexible Belting.
No. 226,843.             Patented April 27, 1880.
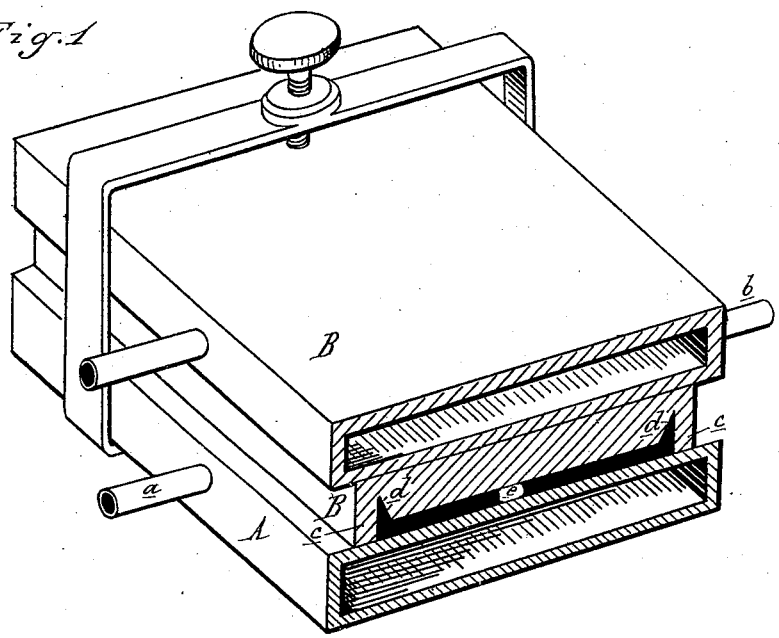
Attest:
A. Barthel
Chas. J. Hunt
Inventor:
W. B. Frue
W. McDermott
By Atty
Thos. S. Sprague

United States Patent Office.

WILLIAM B. FRUE AND WALTER McDERMOTT, OF DETROIT, MICHIGAN.

MANUFACTURE OF FLEXIBLE BELTING.

SPECIFICATION forming part of Letters Patent No. 226,843, dated April 27, 1880.

Application filed January 28, 1880.

*To all whom it may concern:*

Be it known that we, WILLIAM BELL FRUE and WALTER MCDERMOTT, of Detroit, in the county of Wayne and State of Michigan, have invented an Improvement in the Manufacture of Flexible Belts for Ore-Washing Machines, of which the following is a specification.

The nature of our invention relates to certain new and useful improvements in that class of endless belts such as are used in ore-washing machines, and which are designed to carry the broken or pulverized ores from one end of the machine to the other.

The invention consists in the belt itself as a new article of manufacture, and in the peculiar construction and operation of the mechanism by means of which such manufacture is perfected, as more fully hereinafter described.

Figure 1 is a vertical section, showing the hollow bed, the platen, and screw, which form the press. Fig. 2 is a cross-section of the belt itself.

Like letters indicate like parts in each figure so far as is practicable.

In the accompanying drawings, which form a part of this specification, A represents the bed of a press such as is used in rubber-manufactories. This bed is hollow and provided with steam-inlet pipe $a$ and outlet-pipe $b$. The platen B is provided with ribs or faces $c$, which are the only parts of said platen which come into contact with the bed, and this contact enables the platen to be heated by induction from the bed when the latter is heated by steam. If preferred, the body of the platen may also be hollow and heated by steam admitted through inlet-pipes adapted to allow of a vertical movement of the platen. The under side of this platen is provided with grooves $d\,d$, and the face is cut away between the grooves in order to leave a space, $e$, between it and the upper face of the bed, such space being the required thickness of the belt when made.

C is the belt as it comes from the press, and it is provided with flanges $h$, extending the whole length of the belt along each edge thereof, to prevent the dropping therefrom of the ore thereon when the belt is in use.

In machines for washing ore these belts, being made endless, run over and around small rollers at each end of the machines, and when in use they are exposed to the action of water. Hence they must be made of a material flexible and not easily affected by water and of a material that will not stretch; but the flanges, if made of such material, would be cracked or broken as the belt passes around the rollers. Hence the necessity of employing, in combination with a belt, as described, an elastic material for the flanges. Gum-caoutchouc or india-rubber is the best material for the purpose of which we have knowledge, so treated by partial vulcanizing that the portion which forms the belt proper will possess the required flexibility without liability to stretch, while that portion which forms the flanges is left elastic to prevent injury in passing around the rollers.

Many ore-washing machines not only give the belt a rotary motion, but also a lateral oscillating motion, and the flanges on the belt are an absolute necessity to the successful operation of such machines.

The rubber, prepared, as described, by processes well known to the trade, is pressed into the required form between the platen and bed hereinbefore described.

What we claim as our invention, and desire to secure by Letters Patent, is—

1. As an improved article of manufacture, a rubber belt provided with elastic flanges along each edge of such belt, substantially as and for the purposes described and shown.

2. In combination, the hollow bed A, provided with inlet-pipes, and the platen C, provided with grooves $d\,d$ and flange $c$, substantially as and for the purposes set forth.

WILLIAM B. FRUE.
     WALTER McDERMOTT.

Witnesses:
 H. S. SPRAGUE,
 CHAS. J. HUNT.